US008255148B2

(12) United States Patent
Sacle et al.

(10) Patent No.: US 8,255,148 B2
(45) Date of Patent: Aug. 28, 2012

(54) METHOD AND DEVICE FOR OPTIMIZING THE FLIGHT OF AN AIRCRAFT

(75) Inventors: Jérôme Sacle, Toulouse (FR); Phillipe Cambon, Plaisance du Touch (FR)

(73) Assignee: Thales, Neuilly sur Seine (FR)

( * ) Notice: Subject to any disclaimer, the term of this patent is extended or adjusted under 35 U.S.C. 154(b) by 500 days.

(21) Appl. No.: 12/627,069

(22) Filed: Nov. 30, 2009

(65) Prior Publication Data
US 2010/0152927 A1 Jun. 17, 2010

(30) Foreign Application Priority Data

Dec. 12, 2008 (FR) ...................................... 08 07005

(51) Int. Cl.
*F02C 9/44* (2006.01)
(52) U.S. Cl. ............................ 701/123; 340/971; 701/14
(58) Field of Classification Search ........................ 701/3
See application file for complete search history.

(56) References Cited

U.S. PATENT DOCUMENTS

| 4,063,072 | A | * | 12/1977 | Sochtig et al. | 701/99 |
|---|---|---|---|---|---|
| 4,312,041 | A | * | 1/1982 | DeJonge | 701/123 |
| 4,350,880 | A | * | 9/1982 | Quintilian | 235/96 |
| 4,642,775 | A | * | 2/1987 | Cline et al. | 701/528 |
| 4,827,417 | A | * | 5/1989 | Berger et al. | 701/5 |
| 4,843,575 | A | * | 6/1989 | Crane | 701/99 |
| 5,121,325 | A | * | 6/1992 | DeJonge | 701/123 |
| 6,134,500 | A | * | 10/2000 | Tang et al. | 701/528 |
| 7,606,658 | B2 | * | 10/2009 | Wise et al. | 701/457 |
| 8,095,300 | B2 | * | 1/2012 | Villaume et al. | 701/121 |
| 2007/0032941 | A1 | * | 2/2007 | Allen | 701/123 |
| 2008/0300737 | A1 | | 12/2008 | Sacle et al. | |
| 2008/0300738 | A1 | * | 12/2008 | Coulmeau et al. | 701/3 |
| 2008/0312779 | A1 | | 12/2008 | Sacle et al. | |
| 2009/0005918 | A1 | | 1/2009 | Sacle et al. | |
| 2009/0070123 | A1 | * | 3/2009 | Wise et al. | 705/1 |
| 2009/0076721 | A1 | | 3/2009 | Coulmeau et al. | |
| 2009/0082955 | A1 | | 3/2009 | Sacle et al. | |
| 2010/0076672 | A1 | * | 3/2010 | Cremers | 701/123 |

FOREIGN PATENT DOCUMENTS

| DE | 2438030 A1 | 2/1976 |
|---|---|---|
| EP | 0250140 A2 | 12/1987 |

* cited by examiner

*Primary Examiner* — Shelley Chen
(74) *Attorney, Agent, or Firm* — Stroock & Stroock & Lavan LLP

(57) ABSTRACT

The invention relates to a method for optimizing the flight of an aircraft comprising a flight management system, the said flight management system using a first cost index ($CI_1$) and calculating a first speed setpoint ($V_1$) on the basis of the first cost index ($CI_1$), the said flight management system calculating (11), furthermore, a first prediction of remaining flight time ($T_1$) and a first prediction of fuel consumption ($EFOB_1$) on the basis of the first speed, the said method being characterized in that it comprises, furthermore, the following steps:

the selection of a second cost index ($CI_2$), the calculation (12) by the flight management system of a second speed setpoint ($V_2$) on the basis of the second cost index ($CI_2$), of a second prediction of remaining flight time ($T_2$) and of a second prediction of consumption ($EFOB_2$) on the basis of the second speed ($V_2$), the calculation (13) of a discrepancy ($\Delta V$) between the first and the second speed, of a discrepancy ($\Delta T$) between the first prediction of remaining flight time and the second prediction of remaining flight time and of a discrepancy ($\Delta EFOB$) between the first and the second prediction of consumption, the displaying (14) of the discrepancies ($\Delta V, \Delta T, \Delta EFOB$) calculated in the previous step.

The invention allows vice versa the calculation and the consideration of a CI on the basis of the speed entered.

12 Claims, 4 Drawing Sheets

METHOD AND DEVICE FOR OPTIMIZING THE FLIGHT OF AN AIRCRAFT

CROSS REFERENCE TO RELATED APPLICATIONS

The present application claims priority to French Patent Application Serial No. 08/07005, filed Dec. 12, 2008, which is hereby incorporated by reference in its entirety.

TECHNICAL FIELD

The present invention relates to aircraft flight management systems, designated by the acronym FMS ("Flight Management System"), and more particularly to a flight optimization method formulated by such systems.

BACKGROUND OF THE INVENTION

These FMS flight management systems are well known. They make it possible to formulate the flight plan of an aircraft on each mission, by taking account of parameters specific to the aeroplane and to the flight conditions such as the payload, the weight of the aeroplane, the quantity of fuel on board, the temperature, the wind etc., and of the time constraints imposed by the ATC air traffic control bodies: departure and/or arrival time slot required.

Guidance to the flight plan is performed by considering target speeds for each phase of the flight: climb, cruising and descent. These speeds depend on the objective fixed by the company and achieve a compromise between flight time and fuel consumption. According to its objectives the company favours one or the other of these two parameters. Air operations involve a parameter corresponding to a cost index CI, defined as the ratio of the cost of the flight time to the fuel cost: CI=flight time Cost/fuel Cost.

This cost index is in fact a criterion for optimizing between the time costs CT ("Cost of Time"), in $/minute for example, and the fuel costs CF ("Cost of Fuel"), in $/kg for example. The Cost Index is defined by CI=CT/CF, with customary values lying between 0 and 999 (in kg/minute with the units indicated above). The value of this cost index for an aircraft and a given mission is determined according to criteria specific to each operator, and constrains notably the rules for determining the altitudes and speeds of the flight plan (vertical profile of the flight plan). Typically, a cost index CI equal to zero corresponds to a situation in which the cost of time CT is considered to be negligible with respect to the cost of fuel CF: flight planning will consist in seeking fairly low speeds for the least possible consumption, and the flight duration will be longer. For an operator, this typically corresponds to long-haul type flights. A cost index CI equal to 999 corresponds to an opposite situation, in which the cost of fuel CF is considered to be negligible with respect to the cost of time CT: flight planning will consist in seeking the shortest flight duration, even if the fuel consumption has to be high. For an operator, this typically corresponds to flights of shuttle type, so as to allow a maximum number of turn-arounds, or else to ensure an earlier arrival time in case of delay or precise landing slot.

The cost index CI therefore has a direct impact on the speed used for the climb, cruising and descent flight phases and consequently on the climb and descent flight profile as well as the duration of cruising through the positioning of the end-of-climb and start-of-descent points. However, this impact on the associated speed setpoint is not linear, for example a cost index CI of zero could lead to a speed of Mach 0.76, a cost index CI of 100 to Mach 0.82 and a CI of 900 to Mach 0.84. The relationship between the cost index CI and the speed is not easy for the pilot to grasp.

A problem arises in particular when the pilot is obliged to change speed because of an order from air traffic control, for example. The pilot can use the cost index CI, changing the latter to modify the speed of the aeroplane. This modification of the target speed is taken into account immediately by the aircraft with an effect on the engine regime. This represents a considerable drawback, notably at high altitudes, when the aeroplane flies under a regime close to the maximum engine regime. When the drop in speed is too considerable, a considerable lag is then necessary in order for the aeroplane to regain speed.

Moreover, the pilot of the aircraft is completely ignorant of the impact on the flight time, the difference in consumption and the Mach/speed discrepancy. The adjustment of the cost index CI and of the resulting parameters is therefore not intuitive.

An alternative consists in working to a secondary flight plan. A secondary flight plan is a copy of the active flight plan allowing the cockpit crew to modify the flight plan manually to take account of new characteristics or parameters, while ensuring the permanence of the active flight plan, that is to say without disturbing the systems which take it as reference. Once the modifications have been terminated on the secondary flight plan, the latter can become the active flight plan and vice-versa by order of the cockpit crew. The use of a secondary flight plan to fine-tune a new cost index is hardly practical. This makes it essential to use the same flight plan as the active flight plan not allowing calculation and direct display of the discrepancies in remaining flight time, and speed and consumption discrepancies. Moreover, this manipulation monopolizes a secondary flight plan, which is no longer available for other activities.

In the current design of certain flight management systems, it is possible to use a function known as Constant Mach segment allowing the pilot to specify a speed setpoint over a portion of the cruising phase, at best until the end of cruising. This function is not a regime optimization function but a way of applying an air traffic control speed constraint. It does not generate the calculation of a cost index CI and does not directly present any discrepancy in predictions.

The invention is notably aimed at alleviating the problems cited above by proposing a method and a system aimed at improving the understanding of the choice of the cost index CI, through an interface that does not disturb the current flight regime of the aircraft. The method and the system according to the invention calculate the modifications on the main predictions of flight cost-effectiveness: flight time and fuel consumption.

SUMMARY OF THE INVENTION

For this purpose, the subject of the invention is a method for optimizing the flight of an aircraft comprising a flight management system, the said flight management system using a first cost index $CI_1$ and calculating a first speed $V_1$ on the basis of the first cost index $CI_1$, the said flight management system calculating, furthermore, a first prediction of remaining flight time $T_1$ and a first prediction of fuel consumption $EFOB_1$ on the basis of the first speed $V_1$, the said method being characterized in that it comprises, furthermore, the following steps:
the selection of a second cost index $CI_2$,
the calculation by the flight management system of a second speed $V_2$ on the basis of the second cost index $CI_2$, and the calculation of a second prediction of remaining flight time $T_2$ and of a second prediction of consumption $EFOB_2$ on the basis of the second speed $V_2$, the calculation of a discrepancy $\Delta V$ between the first and the second speed, of a discrepancy $\Delta T$ between the first prediction of remaining flight time and the second prediction of remaining flight time and of a discrepancy $\Delta EFOB$ between the first and the second prediction of consumption, the displaying of the discrepancies $\Delta V, \Delta T, \Delta EFOB$ calculated in the previous step.

According to a characteristic of the invention, the selection of the second cost index $CI_2$ is performed directly by a pilot.

According to a characteristic of the invention, the selection of the second cost index $CI_2$ is performed indirectly by a pilot, the said pilot selecting a speed setpoint, the second cost index $CI_2$ being calculated on the basis of the said speed setpoint.

According to a characteristic of the invention, the method comprises a step of validation of the second cost index $CI_2$ by the pilot, the second cost index $CI_2$ replacing the first cost index $CI_1$ if the second cost index $CI_2$ is validated by the pilot of the aircraft, the said validation giving rise to the consideration of the second speed by a speed-based guidance automated facility of the flight management system.

According to a characteristic of the invention, the said aircraft flying along air routes, the said method comprises, furthermore, a step of recording the cost indices CI used successively on one and the same air route.

The invention also relates to a device for optimizing the flight of an aircraft comprising a flight management system, the said flight management system using a first cost index $CI_1$ and calculating a first speed setpoint $V_1$ on the basis of the first cost index $CI_1$, the said flight management system calculating, furthermore, a first prediction of remaining flight time and a first prediction of consumption on the basis of the first speed, calculating characterized in that it furthermore comprises:

means for selecting a second cost index $CI_2$, means for the calculation of a second speed setpoint $V_2$ on the basis of the second cost index $CI_2$, of a second prediction of remaining flight time and of a second prediction of consumption on the basis of the second speed $V_2$, means for the calculation of a discrepancy between a first and the second speed, of a discrepancy between the first prediction of remaining flight time and the second prediction of remaining flight time and of a discrepancy between the first and the second prediction of consumption;

means for displaying the calculated discrepancies.

According to a characteristic of the invention, the means for selecting a cost index comprise:

a first key for sliding a cursor over a scale of cost indices CI or of speed in a first direction, corresponding to a decrease in the cost index and a second key for sliding the cursor over the scale of cost indices CI or of speed in a second direction and corresponding to an increase in the cost index.

According to a characteristic of the invention, an interval of displacement of the cursor between a first of cost index $CI_1$ and a second of cost index $CI_2$, that are consecutive, is dependent on a discrepancy between a first speed $V_1$ and a second speed $V_2$, the first speed $V_1$ being calculated on the basis of the first cost index $CI_1$ and the second speed $V_2$ on the basis of the second cost index $CI_2$.

According to a characteristic of the invention, the means for selecting a cost index or a speed comprise: a keyboard for entering the value of the cost index and a key for validating the value entered.

According to a characteristic of the invention, the display means comprise: a dedicated page displaying the time discrepancy, the fuel consumption discrepancy, the speed discrepancy and the new speed.

According to a characteristic of the invention, the device is integrated into the flight management system.

According to a characteristic of the invention, the aircraft furthermore comprising a server dedicated to documentation EFB, the said device is integrated into the said server dedicated to documentation.

The invention has the advantage of allowing the pilot to evaluate the consequences of a modification of the cost index CI on the flight time, the fuel consumption and the speed discrepancy for the remaining part of the flight. In contradistinction to the system according to the known art, the change of cost index CI and its impact on the flight predictions are not taken into account immediately by the aircraft as long as they are not activated by the pilot. The invention therefore allows the evaluation of various possibilities of cost index CI on the predictions in a manner that is uncorrelated with the cost index CI used by the aircraft at the same moment and therefore not involving an instantaneous change of speed. The pilot can therefore undertake several evaluations of flight regime modification on the associated parameters without consequence for the flight and the engine regime. In this way, the pilot obtains an overview of the result of the change that he has made on the flight regime.

Moreover, when the air traffic control imposes a Mach speed setpoint, the pilot can determine the corresponding cost index CI and retain the speed managed by the FMS (called managed mode), improving the calculation of the predictions.

Another advantage of the invention is that of facilitating the understanding of the use of the cost index CI over its non-linear span of values. The invention therefore facilitates the strategic flight optimization managed by the flight management system through the modification of the cost index CI and the fast obtainment of the main predictions for the remainder of the flight. The invention allows vice versa the calculation and the consideration of a CI on the basis of the speed entered.

The invention also facilitates the tracking over a given period (for example several months) of the cost index CI over a given route on the basis of the initial cost index CI adjusted by the pilot according to the vagaries encountered. This makes it possible to propose the use of a cost index CI that is more suited to the route and to the conditions of the day, which may then be considered in a systematic manner by the operator. This involves a strategic means of adapting the cost index CI, helping to improve cost-effectiveness in a simple and precise manner depending on daily vagaries (delay on departure, headwinds, lengthening/shortening of the route, etc.), starting from a base cost index CI recommended by the operator. The scheme based on cost index CI is nowadays the finest means for optimizing a flight. The choice of a cruising regime (Long Range, Min Time, Maxi range) is merely a flight optimization trend that does not replace the benefit of using the cost index CI for which applications are developed that aid operators to optimize the flight according to the routes of their network.

The invention will be better understood and other advantages will become apparent on reading the detailed description given by way of nonlimiting example and with the aid of the figures among which:

DETAILED DESCRIPTION OF THE INVENTION

An aircraft speed setpoint in terms of indicated speed (Indicated/Calibrated Air Speed) or in terms of Mach onwards of a certain altitude, is formulated as a function of the following parameters: the weight of the aircraft, the scheduled cruising altitude, a cost index CI and meteorological parameters (wind, temperature).

On the basis of the weight of the aeroplane, of the cruising altitude and of the meteorological parameters, the method according to the invention calculates, for each cost index CI proposed by the pilot, a setpoint speed and discrepancies of fuel consumption, remaining flight time, and speed.

Figure 1:
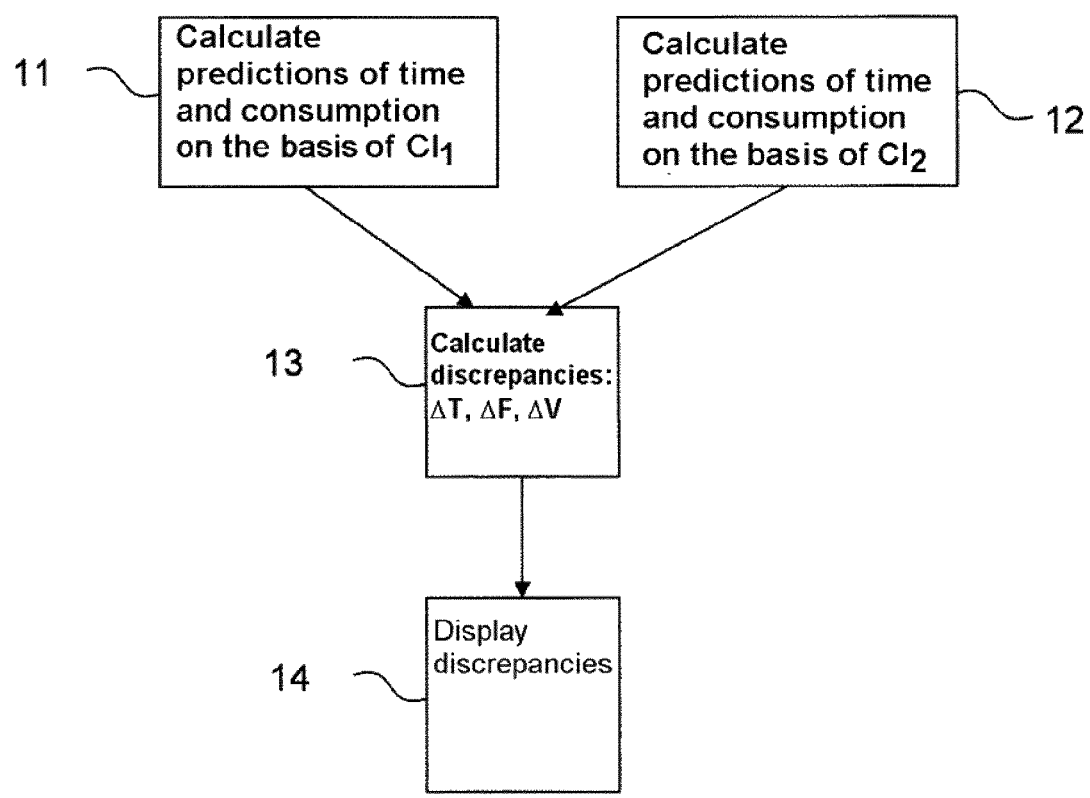
FIG. 1 represents a flowchart illustrating the main steps of the method according to the invention.

FIG. 1 represents a flowchart illustrating the main steps of the method according to the invention. This method is implemented in an aircraft comprising a flight management system. This flight management system uses a first cost index $CI_1$ and calculates a first speed setpoint $V_1$ on the basis of the first cost index $CI_1$. This flight management system calculates 11, furthermore, a first prediction of remaining flight time $T_1$ to the destination of the aircraft and a first prediction of consumption $EFOB_1$ of fuel to the destination of the aircraft on the basis of the first speed $V_1$. The method according to the invention comprises the following steps.

The method according to the invention comprises a step of selecting a second cost index $CI_2$. In a first variant of the method according to the invention, this selection is performed directly by the pilot who enters the second cost index $CI_2$. This entry does not modify the current cost index which is still the first cost index. The flight management system calculates a second target speed $V_2$, a second prediction of remaining flight time $T_2$ and a second prediction of fuel consumption $EFOB_2$ on the basis of the second speed $V_2$. This calculation of predictions relates to the path going from the current position of the aircraft to its destination. This calculation is performed using the same calculation scheme as that used for the predictions based on the first cost index.

The following step consists in calculating 13: a discrepancy $\Delta V$ between the first $V_1$ and the second speed $V_2$, a discrepancy $\Delta T$ between the first prediction of remaining flight time $T_1$ and the second prediction of remaining flight time $T_2$ and a discrepancy $\Delta EFOB$ between the first $EFOB_1$ and the second $EFOB_2$ consumption prediction. The calculation of these discrepancies is carried out by subtraction between the predictions calculated on the basis of the second cost index and predictions calculated on the basis of the first cost index:

$\Delta EFOB = EFOB_2 - EFOB_1$
$\Delta T = T_2 - T_1$
$\Delta V = V_2 - V_1$

The following step is the displaying 14 of the discrepancies calculated in the previous step 13.

The pilot can then: either modify the second cost index $CI_2$ so as to repeat the previous calculation, still with respect to the parameters resulting from the first cost index $CI_1$; or activate the second cost index $CI_2$ for consideration. In the latter case, the second cost index $CI_2$ replaces the first cost index $CI_1$.

The scheme for calculating the predictions based on the cost index CI is similar to that of the performance functions of current FMSs. The invention differs from the flight management systems according to the known art in that it consists of a calculation of the discrepancies in remaining time $\Delta T$, consumption $\Delta EFOB$ and speed $\Delta MACH/SPD$ by comparing the predictions obtained by the same calculation scheme with the first $CI_1$ and the second $CI_2$ cost index and in that it also comprises the creation of a temporary cost index (the second cost index $CI_2$) tied to the active flight plan and easily adjustable through a pilot interface described further on in the description.

Figure 2:
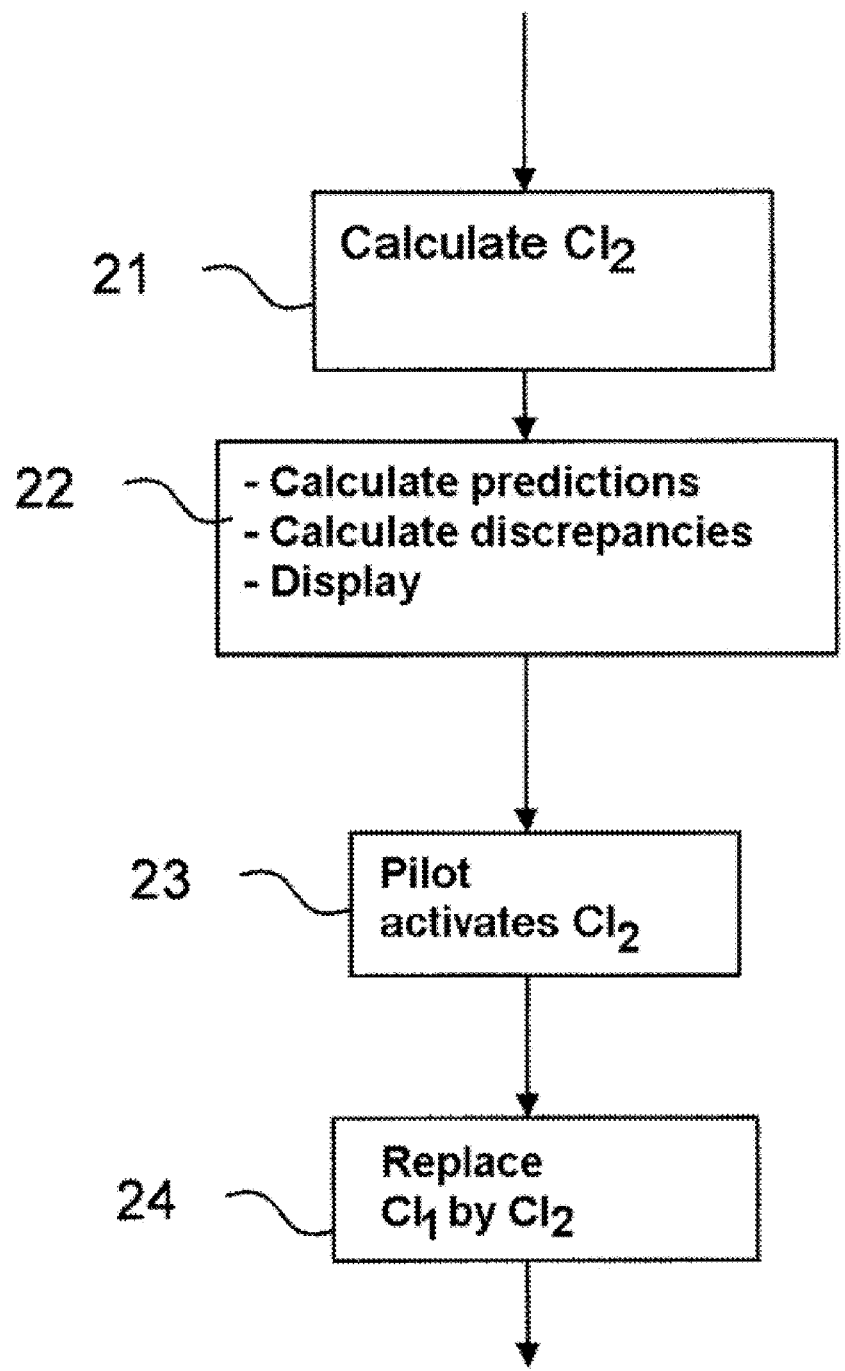
FIG. 2 represents a flowchart illustrating the steps of a variant of the method according to the invention.

FIG. 2 represents a flowchart illustrating the steps of a variant of the method according to the invention. In a second variant of the method according to the invention, the selection of the second cost index $CI_2$ is indirect: a speed setpoint is entered by the pilot and then the second cost index $CI_2$ is calculated on the basis of this speed. This calculation is done on the basis of a function or a table. The remainder of the scheme culminating in the time, consumption and speed discrepancies is carried out on the same principle.

In the cruising phase, the method calculates a new cost index $CI_2$ when the pilot inputs a Mach setpoint (or speed), with known weight, flight level and meteorological conditions so as to be able to use the new cost index $CI_2$ calculated by the EMS in order to comply with the speed requested by the air traffic controller.

The pilot then inputs a new setpoint speed in terms of Mach, for example. The flight management system calculates 21 a second cost index $CI_2$ on the principle of the Mach-CI association with fixed weight, altitude and meteorological parameters. The function F such that Mach=$F(CI_2)$ being known, $CI_2 = F^{-1}(Mach)$ is obtained. The flight management system displays the second cost index $CI_2$.

The flight management system calculates a second prediction of remaining flight time $T_2$ and a second prediction of fuel consumption $EFOB_2$ on the basis of the speed setpoint, termed the second speed $V_2$. The flight management system also calculates: a discrepancy $\Delta V$ between the first $V_1$ and the second speed $V_2$, of a discrepancy $\Delta T$ between the first prediction of remaining flight time $T_1$ and the second prediction of remaining flight time $T_2$ and of a discrepancy $\Delta EFOB$ between the first $EFOB_1$ and the second $EFOB_2$ consumption prediction. The following step is the displaying of the discrepancies calculated in the previous step.

Thereafter, the pilot confirms 23 the activation of the second cost index $CI_2$. The flight management system calculates or resumes the Mach setpoint, Mach=F (CI) in replacement for the current CI. If the second cost index $CI_2$ is not activated, the speed will be unchanged, the current Mach remains the target speed.

The flight management system takes into account the second speed $V_2$. The flight management system recalculates the predictions (time and fuel) for the remainder of the flight plan from the current position of the aeroplane on the basis of the second speed $V_2$.

Thus in an advantageous manner, the aeroplane remains in "managed" speed mode which allows the calculation of the predictions of the flight plan and the visualization of a cost index CI representative of the current flight regime.

According to a characteristic of the invention, the method comprises, furthermore, the calculation of a discrepancy $\Delta CI$ between the second $CI_2$ and the first $CI_1$ cost index.

The method according to the invention can also be used on the ground in the flight preparation phase, by calculating the time, consumption and speed discrepancies over the whole of the flight plan on the basis of the selected cost index applicable to all the flight phases up to the approach.

The method according to the invention can be implemented in flight in the climb, cruising, or descent phase by calculating the discrepancies in time, consumption and speed from the current position up to the destination on the basis of the consideration of a second cost index up to the approach. The flight phase where the modification of the cost index is the most significant is the cruising phase.

During a throttle-back climb towards a new cruising level, on a clearance flight plan the function can be used again.

According to a characteristic of the invention, the method comprises a step of recording the cost indices CI used successively on one and the same route. The recording is performed by tying to a route identified by a departure and arrival airport and for each route adopted. If in the course of a flight the cost index CI is changed, this is also recorded. The recording is retrievable for the company so that the ground crew can view the cost indices CI adopted by the aircrews in the course of time. The recording can also comprise the discrepancies in time and in fuel consumption calculated on the basis of the new cost index CI.

Figure 3:
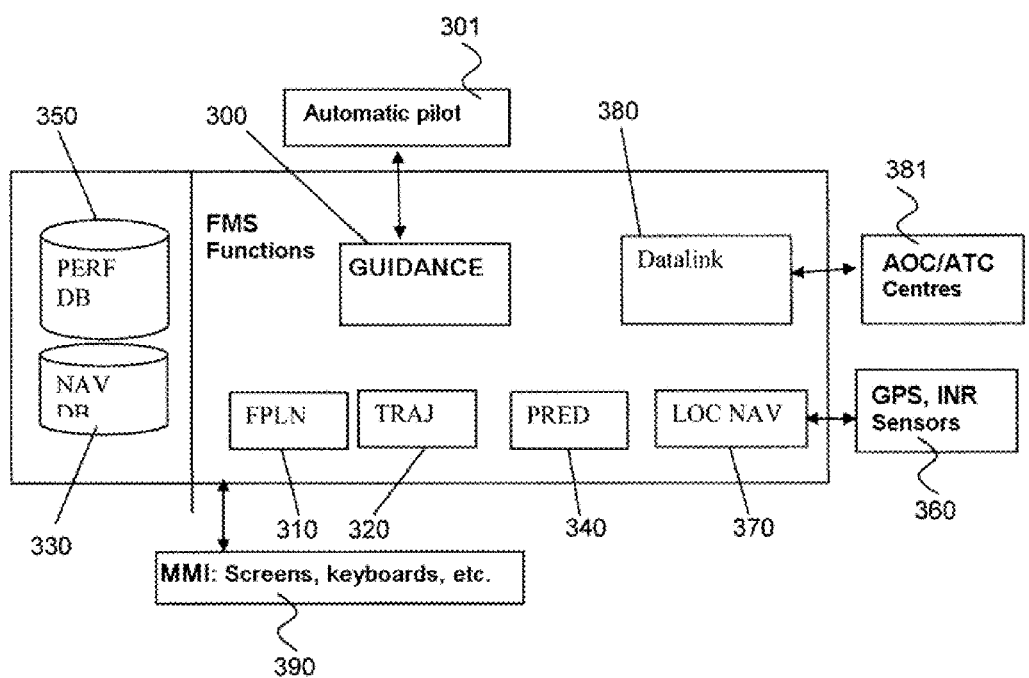
FIG. 3 illustrates an architecture of a flight management system.

FIG. 3 illustrates an architecture of a flight management system. A flight management system FMS having the following functions described in the ARINC standard 702 (Advanced Flight Management Computer System, December 1996):

- Navigation LOCNAV 370 for performing optimal location of the aircraft as a function of the geolocation means 360 (GPS, GALILEO, VHF radio beacons, inertial platforms);
- Flight plan FPLN 310 for entering the geographical elements constituting the skeleton of the route to be followed (departure and arrival procedures, waypoints);
- Navigation database NAVDB 330 for constructing geographical routes and procedures with the help of data included in the bases (points, beacons, interception or altitude legs, etc.);
- Performance database, PRF DB 350 containing the craft's aerodynamic and engine parameters.
- Lateral Trajectory TRAJ 320 for constructing a continuous trajectory on the basis of the points of the flight plan, complying with the aircraft performance and with the confinement constraints;
- Predictions PRED 340 for constructing a vertical profile optimized on the lateral trajectory;
- Guidance GUID 300 for guiding in the lateral and vertical planes the aircraft on its trajectory 3D, while optimizing the speed and linked to an automatic pilot 301;
- digital data link DATALINK 380 for communicating with the control centres 381 and other aircraft.

These various functions are accessible to the pilot via an interface 390. The flight plan is input by the pilot (or by data link) on the basis of data contained in the navigation database. It consists of a succession of segments called "legs" which are formed of a termination and of a geometry (turn, great circle, rhumb line etc.).

These legs are standardized at the international level in an AEEC document (ARINC 424). The pilot then inputs the aircraft parameters (weight, cruising levels, optimization criteria etc.) allowing the modules TRAJ and PRED to calculate respectively the lateral trajectory and the vertical profile (altitude/speed).

According to a variant of the invention, the flight optimization device is implemented at the level of the predictions PRED. The guidance part GUID is impacted when the cost index is modified.

According to another variant of the invention, the flight optimization device is implemented at the level of an Electronic Flight Bag called EFB. An electronic flight "bag" EFB is a server on board the aeroplane dedicated to documentation. The device according to the invention is interfaced with the flight management system for guidance GUID, the EFB ensuring the prediction calculations.

In the subsequent description, it is considered that the invention is implemented in a flight management system.

Figure 4:
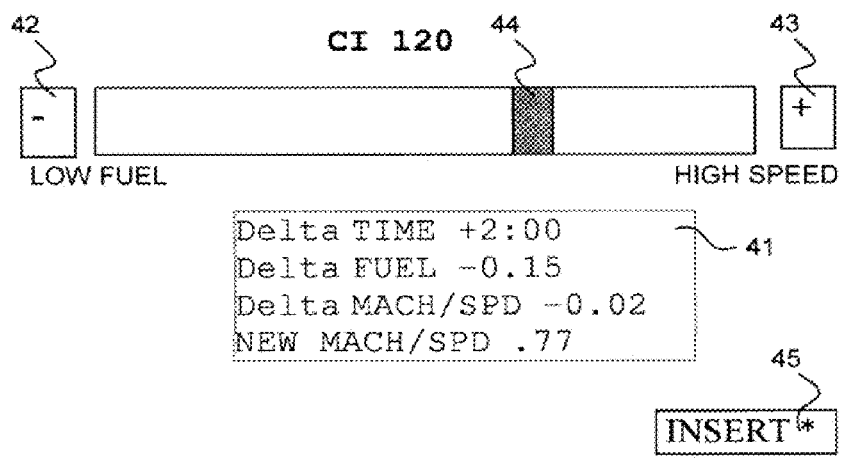
FIG. 4 presents a first exemplary implementation of the display means of the system according to the invention.

FIG. 4 presents a first exemplary implementation of the display means of the system according to the invention. The interface is situated on dedicated page 41, given by way of example, when considering an interactive interface or based on prompts and keys for the older generation of FMS. The pilot can either input a cost index CI or use "minus" 42 and "plus" 43 keys to slide a cursor 44 over a scale 45 of the cost indices CI giving rise to the calculation of a new cost index CI corresponding to the position of the cursor 44. The cost index CI displayed is equal to 120. The displays of the dedicated page corresponding to a decrease in the cost index giving rise to an increase in the duration of the flight (DeltaTime=+2) expressed in minutes and seconds, a decrease in the fuel consumption (DeltaFuel=−0.15) expressed in tonnes and a decrease in the speed (DeltaMach/Spd=−0.02) expressed in Mach. The new speed (new mach/spd) is Mach 0.77.

According to a characteristic of the invention, when various flight phases are considered, the interface presents Mach/speed discrepancies for each flight phase (climb, descent, cruising) as well as the associated target Mach/speed.

Figure 5:
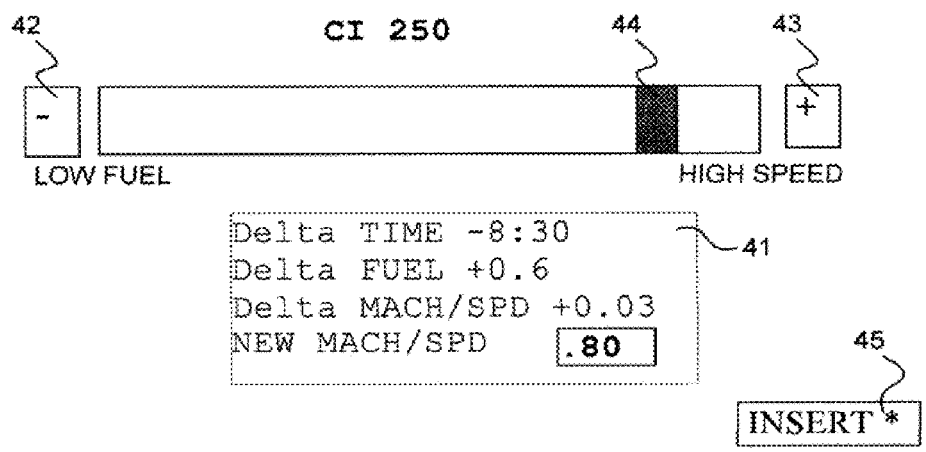
FIG. 5 presents a second exemplary implementation of the display means of the system according to the invention.

FIG. 5 presents a second exemplary implementation of the display means of the system according to the invention. The interface is identical to that of FIG. 4. The display corresponds to an entry of the speed by the pilot, validated by a dedicated key 45. The new speed is Mach.8. The new cost index CI calculated with the method according to the invention is 250. The discrepancies are likewise calculated with the method according to the invention. The flight duration discrepancy (DeltaTime) is −8.3, the fuel consumption discrepancy (DeltaFuel) is +0.6 and the speed discrepancy (DeltaMach/Spd) is +0.03.

According to a characteristic of the invention, an interval of displacement of the cursor 44 between a first of cost index $CI_1$ and a second of cost index $CI_2$, that are consecutive, is dependent, for example proportional, on a discrepancy between a first speed $V_1$ and a second speed $V_2$, the first speed being calculated on the basis of the first cost index and the second speed on the basis of the second cost index. For discrepancies of cost index CI that do not generate any speed discrepancy, the cursor may not move, thus amounting to considering a speed scale even if it is linked to the cost index CI.

In the case where an elementary increase in the cost index (plus one) has no influence on the speed, then the effect of pressing the plus key 43 will be to position the cursor at the closest value of cost index increasing the speed. In the case where an elementary decrease in the cost index (minus one) has no influence on the speed, then the effect of pressing the minus key 42 will be to position the cursor at the closest value of cost index decreasing the speed.

In general, the cost index has a maximum impact on the speed over a span of relatively restricted value. For example, for a cost index CI defined for values lying between 0 and 999, the cost index has a maximum impact for a span of values ranging from 10 to 100. In this span, a modification of the index causes a considerable variation in the speed. But beyond this span considerable variations in the cost index have minimal impacts on the speed. This characteristic has the advantage of visually illustrating the non-linear and scarcely intuitive relationship between the cost index and the speed: a weighting for the conditions of the day involving, for one and the same Mach, different CIs from one day to another.

The invention claimed is:

1. Method for optimizing the flight of an aircraft comprising a flight management system, the said flight management system using a first cost index ($CI_1$) and calculating a first speed ($V_1$) on the basis of the first cost index ($CI_1$), the said flight management system calculating, furthermore, a first prediction of remaining flight time ($T_1$) and a first prediction of fuel consumption ($EFOB_1$) on the basis of the first speed ($V_1$), the said method wherein it comprises, furthermore, the following steps:

the selection of a second cost index ($CI_2$), the calculation by the flight management system of a second speed ($V_2$) on the basis of the second cost index ($CI_2$), and the calculation of a second prediction of remaining flight time ($T_2$) and of a second prediction of consumption ($EFOB_2$) on the basis of the second speed ($V_2$), the calculation of a discrepancy ($\Delta V$) between the first and the second speed, of a discrepancy ($\Delta T$) between the first prediction of remaining flight time and the second prediction of remaining flight time and of a discrepancy ($\Delta EFOB$) between the first and the second prediction of consumption, the displaying of the discrepancies ($\Delta V, \Delta T, \Delta EFOB$) calculated in the previous step.

2. Method for managing the flight of an aircraft according to claim 1, wherein the selection of the second cost index ($CI_2$) is performed directly by a pilot.

3. Method for managing the flight of an aircraft according to claim 1, wherein the selection of the second cost index ($CI_2$) is performed indirectly by a pilot, the said pilot selecting a speed setpoint, the second cost index ($CI_2$) being calculated on the basis of the said speed setpoint.

4. Method for managing the flight of an aircraft according to claim 1, wherein it comprises a step of validation of the second cost index ($CI_2$) by the pilot, the second cost index ($CI_2$) replacing the first cost index ($CI_1$) if the second cost index ($CI_2$) is validated by the pilot of the aircraft, the said validation giving rise to the consideration of the second speed by a speed-based guidance automated facility of the flight management system.

5. Method for managing the flight of an aircraft according to claim 1, wherein the said aircraft flying along air routes, the said method comprises, furthermore, a step of recording the cost indices CI used successively on one and the same air route.

6. Device for optimizing the flight of an aircraft comprising a flight management system, the said flight management system using a first cost index ($CI_1$) and calculating a first speed setpoint ($V_1$) on the basis of the first cost index ($CI_1$), the said flight management system calculating, furthermore, a first prediction of remaining flight time and a first prediction of consumption on the basis of the first speed, wherein it furthermore comprises:

means for selecting a second cost index ($CI_2$), means for the calculation of a second speed setpoint ($V_2$) on the basis of the second cost index ($CI_2$), of a second prediction of remaining flight time and of a second prediction of consumption on the basis of the second speed ($V_2$), means for the calculation of a discrepancy between a first and the second speed, of a discrepancy between the first prediction of remaining flight time and the second prediction of remaining flight time and of a discrepancy between the first and the second prediction of consumption, means for displaying the calculated discrepancies.

7. Device for optimizing flight according to claim 6, wherein the means for selecting a cost index comprise:

a first key for sliding a cursor over a scale of cost indices (CI) or of speed in a first direction, corresponding to a decrease in the cost index and a second key for sliding the cursor over the scale of cost indices (CI) or of speed in a second direction and corresponding to an increase in the cost index.

8. Device for optimizing flight according to claim 7, wherein an interval of displacement of the cursor between a first of cost index ($CI_1$) and a second of cost index ($CI_2$), that are consecutive, is dependent on a discrepancy between a first speed ($V_1$) and a second speed ($V_2$), the first speed ($V_1$) being calculated on the basis of the first cost index ($CI_1$) and the second speed ($V_2$) on the basis of the second cost index ($CI_2$).

9. Device for optimizing flight according to claim 6, wherein the means for selecting a cost index or a speed comprise: a keyboard for entering the value of the cost index and a key for validating the value entered.

10. Device for optimizing flight according to claim 6, wherein the display means comprise: a dedicated page displaying the time discrepancy, the fuel consumption discrepancy, the speed discrepancy and the new speed.

11. Device for optimizing flight according to claim 6, wherein the said device is integrated into the flight management system.

12. Device for optimizing flight according to one claim 6, wherein the aircraft furthermore comprising a server dedicated to documentation (EFB), the said device is integrated into the said server dedicated to documentation.

* * * * *